| United States Patent [19] | [11] 3,904,790 |
| --- | --- |
| Maida | [45] Sept. 9, 1975 |

[54] PRIMER COATING FOR ALUMINUM FOIL SURFACE

[76] Inventor: Saverio M. Maida, Wayne, Pa. 19087

[22] Filed: Oct. 3, 1974

[21] Appl. No.: 511,513

Related U.S. Application Data

[63] Continuation-in-part of Ser. No. 284,701, Aug. 30, 1972, abandoned, which is a continuation-in-part of Ser. No. 66,581, Aug. 24, 1970, abandoned.

[52] U.S. Cl. .............. 427/261; 427/388; 428/195; 428/458
[51] Int. Cl.² .................. B05D 5/04; B05D 1/38
[58] Field of Search ........ 117/132 C, 161 P, 45, 12; 161/214; 260/18 N; 427/261, 388; 428/195, 458

[56] References Cited
UNITED STATES PATENTS

| | | | |
| --- | --- | --- | --- |
| 2,889,233 | 6/1959 | Steffey | 117/12 X |
| 3,123,516 | 3/1964 | Eiland | 117/12 X |
| 3,268,461 | 8/1966 | Jacobson | 260/18 N |
| 3,359,127 | 12/1967 | Meyer et al. | 161/214 X |

*Primary Examiner*—Harry J. Gwinnell
*Attorney, Agent, or Firm*—Fidelman, Wolffe & Leitner

[57] ABSTRACT

This disclosure concerns thin aluminum such as aluminum foil having a specific polyamide coating applied thereto making the aluminum suitable for printing and applications in a broad category, including packaging of food. Also disclosed is a method for accomplishing this result. The polyamide is generally a solid derived from dimer acids reacted with linear diamines such as ethylene diamine or other linear diamines such as propylene diamine, butylene diamine or the like. These resins are thermoplastic in nature and have melting points characteristic of polyamide resins.

4 Claims, No Drawings

PRIMER COATING FOR ALUMINUM FOIL SURFACE

This application is a Continuation-In-Part of Ser. No. 284,701, filed Aug. 30, 1972, and in turn a Continuation-In-Part of Ser. No. 66,581, filed Aug. 24, 1970, both now abandoned.

BRIEF SUMMARY OF THE INVENTION

Various methods have been used through the years for printing on aluminum surfaces, by means of gravure, lithography, flexography, letterpress and the like. In many instances when pure or clean aluminum is employed, problems are maintained at a minimum, although with applications involving aluminum foil it is frequently difficult to print permanently and successfully. Also, problems are frequently encountered in the use of aluminum foil that is considered poisoned or has undesirable contaminants on the surface, such as oil and the like, or aluminum foil that has simply been exposed to the atmosphere for an appreciable length of time. Many attempts have been made to print on such an aluminum foil, but many difficulties have been encountered and unsuccessful results are paramount. This is particularly so when one contemplates using aluminum foil for packaging and especially in the food industry.

Early attempts to solve this problem include the use of dilute solutions of shellac, with or without modification with phosphoric acid, and others, with various degrees of modest success. Recent efforts include the use of polyethylene imine, vinyl sulfonium compounds, and vinyl resins, among others. There still remains a need for an effective, economical method to provide an aluminum foil suitably coated to receive printing and to the article so produced.

The ability to utilize a conventional stock of printing ink formulations is quite important to the print shop called upon to print aluminum foils, since the need of an extensive inventory of expensive specialized inks is avoided. Thus it is apparent that the priming of aluminum substrates is a matter of considerable significance and commercial importance to the art.

More is required of an aluminum primer than adherence to the substrate, although, of course, such adherence is itself of considerable importance. A primer must also be permanently receptive to a broad range of printing ink formulations without smearing or peeling, but must not be swollen or dissolved in the solvent systems employed, and must not otherwise be affected so that delamination from the aluminum substrate might occur or the colors run or diffuse. The primer must also be affected in the formation of a continuous film in small amounts so that its employment is economically practical. The primer must not be susceptible to cracking or peeling when the substrate is bent or folded and must be stable and secure through the manipulations and conditions of a wide variety of printing and packaging procedures. And, of course, the optical properties of the primer must not alter the appearance of the substrate in unprinted areas to an appreciable degree. Temperature stability is another factor of importance in a number of contexts. All these properties must be retained over considerable periods of time.

It is an object of this invention to provide a thin aluminum composition, such as aluminum foil, comprising the thin aluminum having a coating adhered thereto, satisfactory for printing and subsequent use in the packaging industry, particularly for food products.

It is a further object of this invention to provide a printed coated thin aluminum, such as aluminum foil, wherein the aluminum employed is pure, oily, oxidized or poisoned or an aluminum foil laminate having a substrate such as paper, polyethylene, cellophane and the like.

DETAILED DESCRIPTION

This invention involves the use of a specific polyamide which is applied preferably from a solution and then dried according to conventional techniques, such as air blowing, heat drying or a combination of both, to a clear, transparent, colorless and continuous film. Although the method of the present invention can be employed on aluminum of various thicknesses, and including for these purposes the alloys of aluminum, the present invention has as a focus of emphasis the use of aluminum foil, such as in the typical range of about 0.0003 to about 0.0055 inch. The thinner foils are usually laminated to other substrates as is known in the art and indicated above.

The present invention can also be employed with aluminum having thicknesses up to about 0.007 inch. Aluminum having thicknesses up to about 0.0055 inch is frequently employed as a wrapping in the packaging industry whereas the greater thicknesses just mentioned are employed in the manufacture of cans and stable containers.

As mentioned previously, by the use of the method of the present invention the polyamide coating can be applied directly to the aluminum foil, whether the foil be clean, or not, without any process of cleaning or treating before the application of the polyamide coating. The specific polyamide employed in the present invention is normally a solid derived from dimer acids reacted with linear diamines such as ethylene diamine, or other linear diamines as propylene diamine, butylene diamine or the like which would give a desirable product. Ethylene diamine is preferred. These resins are thermoplastic in nature and have melting points characteristic of polyamide resins.

The dimer acids are viscous aliphatic dibasic acids of about 36 carbon atoms produced by polymerization of unsaturated fatty acids. The acid, of course, may have substituents that can be aromatic such as that exemplified by diphenolic acid, which is a preferred embodiment. These resins may be more fully defined as polymerized amides having a molecular weight in the range of about 3,000 to about 10,000 and above, preferably about 3,500 to about 5,500. It is desirable to employ a polyamide prepared from dimer acids, diphenolic acid and an alkylene diamine. One preferred commercially available polyamide resin is Emerez Resin 1533 manufactured by Emery Industries, Inc. and is prepared from dimerized fatty acids, diphenolic acid and ethylene diamine. This resin has a softening point of about 98° to 108°C., an amine value of about 5.0 to 8.5 mg of KOH/gm, an acid value of 2.5 to 3.75 mg KOH/gm, and a specific gravity of about 0.99. It has a molecular weight of about 4,000.

One may apply the polyamide resin to the aluminum by employing a solution in a normal manner. The polyamide resin contemplated by this invention is soluble in organic, preferably aliphatic, solvents such as isopropanol and solvent mixture, especially those comprising isopropanol or propanol with such other solvents as ethanol, butanol, naphtha, mineral spirits, toluene, xylene, 2-nitropropane, isopropyl acetate, Cellosolve, or the like. The preferred solvent is isopropanol alone or a solvent mix of one or more other solvents with isopropanol in which the isopropanol predominates. One skilled in the art can readily select a solvent system based to some extent on the particular application. The polyamide solution can be employed in concentrations of any desired amount, but preferably in the range of about 10 to 30 percent by weight, and especially about 16 to 24 percent by weight. Typically, the polyamide solution can be applied by a conventional printing press operation such as rotogravure or flexographic procedure or a conventional coating machine.

Although the polyamide resin just discussed may be employed satisfactorily as an individual polyamide resin or as a mixture of polyamide resins, it is possible and may be desirable in some situations, to employ in conjunction with the polyamide resin or resins, small amounts of other compatible resins. For instance, one may employ small to moderate amounts, for instance about 1 to about 30% by weight of rosin esters, hydrogenated rosin polymerized resin, refined shellac, ketone based resins, nitrocellulose resins, and other natural and synthetic resins. It is also possible to employ known modifiers in the usual amounts, such as dibutyl and dioctyl phthalate, tricresyl phosphate, sulfonamides and the like. If one skilled in the art desires to employ other resins along with the polyamide resins of the present invention, compatible solvent systems must of course be employed. One then merely mixes the organic solvent system containing the polyamide of the present invention with selected amounts of a compatible organic solvent system containing any other selected resin or resins or modifiers described hereinbefore.

The specific polyamide solution of this invention should be applied in such amounts that after the solvent has been removed there remains on the surface of the aluminum about one quarter pound to about two and a half pounds of the specific polyamide resin per ream of 3,000 square feet. Appreciably less than about one quarter pound per 3,000 square feet may lead to an iridescent appearance which may be commercially undesirable and amounts substantially greater than two and a half pounds per 3,000 square feet lead to haze discoloration, which is usually commercially undesirable, and, otherwise, offers no noticeable benefits. The preferred range is from about 0.5 pounds to about 1.5 pounds per 3,000 square feet.

It is preferred to dry the polyamide coating at elevated temperatures in order to expedite the process. Temperatures in the range of about 150°F to about 600°F can be employed, preferably 150°F to 300°F. The polyamide solution dries rapidly, usually in a matter of seconds up to about 5 to 20 seconds, and possibly faster, under temperatures described hereinbefore and, therefore, rapid high volume techniques can be employed. After drying the polyamide solution so that a continuous film of polyamide is thoroughly adhered to the foil and the foil is then in condition for printing and a wide range of different inks can be used and applied, such as by conventional rotogravure or flexographic methods. It is an additional advantage of the present invention that most all types of known inks may be used equally satisfactorily. For instance, one may employ "C" type (lacquer based) inks, "T" type (toluene dilutable) inks, polyamide type inks, or "X" type (mixtures) inks without any difficulties. This is in sharp contrast to corresponding situations in the prior art where one must select carefully the coating for the aluminum with the foreknowledge of the type of ink that will be used for printing thereon. The present invention shows no such restrictions. Furthermore, the aluminum can be treated and printed as desired, and promptly printed in essentially one operation or, if desired, the aluminum can be coated with the polyamide and the printing done far in the future, if desired. Storage of the coated aluminum can be for prolonged periods of time without any adverse effects. Accordingly, one is free to choose production schedules with pronounced economic advantage.

The printed polyamide film adheres tenaciously to the aluminum surface and is resistant to a wide variety of materials, such as water, oil, solvents and mild alkalies and acids, among others, and is ready to accept inks for printing and decoration. The finished article is, also, resistant to abrasive, bending and scratching forces and is, thereby ideally suited for its use in the packing industry, particularly in food packaging.

What is claimed:

1. A method of coating metal foil to enhance the receptivity of said metal foil to printing ink comprising:
    applying to the metal foil about 0.25 to about 2.5 pounds on a solids basis per 3000 square feet of foil a continuous, transparent, colorless primer coating film of a solution consisting essentially of a polyamide resin prepared from dimerized fatty acids, diamines and diphenolic acid, wherein the solution of the polyamide resin contains from about 10 to about 30% by weight of the polyamide resin in an appropriate solvent;
    wherein the polyamide resin has a softening point of from about 98° to 108°C., an amine value of from about 5.0 to about 8.5 milligrams of potassium hydroxide per gram, an acid value of from about 2.5 to about 3.75 milligrams of potassium hydroxide per gram and a specific gravity of about 0.99;
    and drying said coating at a temperature of from about 150°F. to about 600°F.

2. The method fo claim 1 wherein the polyamide resin has a molecular weight of about 4,000.

3. The method of claim 1 wherein the dried, coated metal foil is subsequently printed with a printing ink.

4. The method of claim 3 wherein the printing ink is selected from the group consisting of lacquer-based inks, toluene dilutable inks, polyamide inks or mixtures thereof.

* * * * *